April 12, 1927.

R. J. BRITTAIN, JR

GAUGE

Filed March 14, 1924

1,624,654

Inventor:
Richard J. Brittain Jr.,
By
his Attorney.

Patented Apr. 12, 1927.

1,624,654

UNITED STATES PATENT OFFICE.

RICHARD J. BRITTAIN, JR., OF NEWARK, NEW JERSEY, ASSIGNOR TO GENERAL MOTORS CORPORATION, OF DETROIT, MICHIGAN, A CORPORATION OF DELAWARE.

GAUGE.

Application filed March 14, 1924. Serial No. 699,227.

This invention relates to gauges and is herein shown as embodied in an external diameter gauge for measuring race rings, shafts and other circular objects.

When grinding cylindrical articles such as race rings for roller bearings, it is customary, at intervals during the process of grinding, for the operator to stop the rotation of the work and apply a measuring instrument, such as a micrometer gauge, to indicate how far the operation has proceeded. Such instruments, heretofore have been slow to manipulate and have not been readily located in the proper position with respect to the work to give an accurate reading.

One of the objects of this invention, therefore, is to provide an accurate guage of a character which can be easily and quickly manipulated. Another object is to provide an improved gauge which will be self locating with respect to the work.

To these ends and also to improve generally upon devices of the character indicated my invention consists in the various matters hereinafter described and claimed.

Referring to the drawings, Figure 1 is a front elevation of the gauge, partly broken away and in section.

Figure 1:
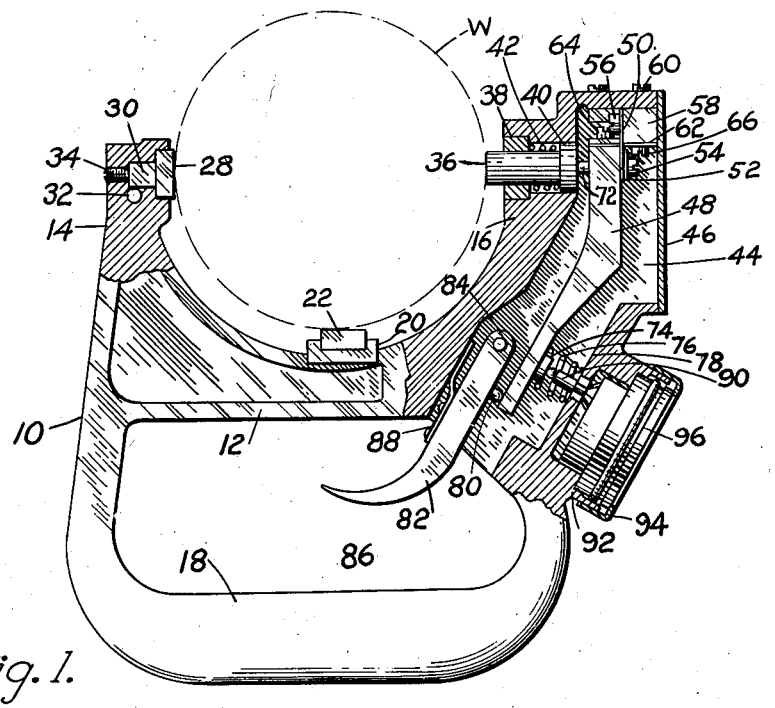
Figure 2:
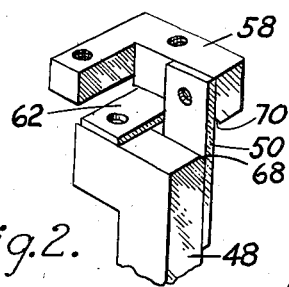
Figure 2 is a perspective view of a detail.
Figure 3:
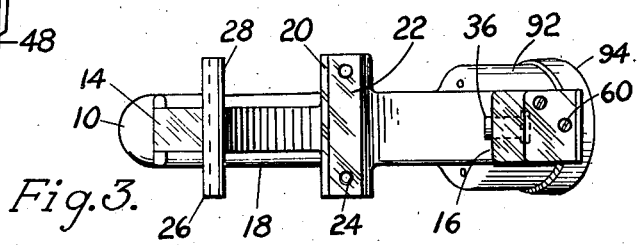
Figure 3 is a plan view.

The numeral 10 indicates a frame member a portion of which is substantially U-shaped, the U-shaped portion having a base 12 and arms 14 and 16 to straddle the article which is to be gauged. A grip or handle 18 is integrally formed with the base portion 12. The frame member 10, near the middle, has a wide portion 20 which is recessed to receive a flat work-positioning plate 22, the latter having a line contact with the work piece W and being tangent to the latter. The plate 22 is held in the recess by any suitable means such as screws 24. The frame member 10 also has a wide portion 26 integral with the arm 14 and recessed to receive a second work-positioning plate 28. The plate 28 has a holding stud 30 entering a cylindrical recess in the arm 14 where it can be clamped by a screw 32 and an adjusting screw 34 is threaded in the arm 14 and abuts against the end of the stud 30. The plate 28 also has a line contact with the article W and its flat face is at right angles to the face of the other positioning plate 22, so that, when the instrument is pressed against a cylindrical work piece, it is automatically positioned in a plane at right angles to the axis of the work piece.

A gauge pin 36 is slidable in a bushing 38 in the arm 16 and has a head or collar 40 slidable in a cylindrical bore, a spring 42 interposed between the bushing and the head acting to withdraw the pin from work engaging position. The gauge pin slides at right angles to the face of the plate 28 and also has a line contact with a cylindrical work piece. The area of the end of the pin is of sufficient extent so that some portion of the plane end face of the pin will come diametrically opposite to that part of the face of the plate 28 which engages the opposite side of the work piece. Hence, work pieces which vary a little in size will be accurately gauged at their portions of greatest diameter. A flat sided recess 44 is formed in the arm 16 and the recess is closed at one end by the cap plate 46. Pivoted at one end in the recess is a lever 48. Any suitable form of pivotal mounting may be used, preferably effected by means of crossed springs. As shown, a thin spring 50 is attached, at one end, by a cleat 52 and a screw 54 to the front of the lever 48 and, at its other end, by a screw 56 to the back of a right angular block 58 which is attached by screws 60 to the upper wall of the recess. A second thin spring 62 is positioned at right angles to the spring 50 and has one end fastened to the upper end of the lever by a screw 64 and its other end attached to the under side of the block 58 by a screw 66. The upper corner of the lever is beveled at 68 and the lower corner of the block 58 is beveled as at 70 to facilitate the flexing of the springs during a slight pivotal movement of the lever.

Near the pivoted end of the lever, is a projection 72 which abuts against the head 40 of the gauge pin and the projection is held continually against the head by a coiled spring 76 supported near the end of the lever by a projection 74 and bearing against a face 78 of the recess. The coil spring 76 is stronger than the coil spring 42 so that the lever is normally pressed in such a direction that it will force the gauge pin outwardly against the work piece but, when the lever is positively moved in the other direction, the spring 42 will withdraw the gauge pin so that the gauge can be applied to its straddling position on another piece of work. A projection 80 on a trigger 82 pivoted at 84 in the recess forms a means for swinging the lever to withdraw the gauge pin. The trigger has a finger piece extending into a hand opening 86 between the grip 18 and the base 12 so that, when the instrument is grasped in the hand, the trigger is naturally actuated. For holding the trigger in the normal position shown, a leaf spring 88 is attached to it and has a flattened portion resting against a flattened face in the recess. The movement of the gauge pin is multiplied by the lever which bears by its projection 74 against the stem 90 of an indicator held in a cylindrical housing 92 by means of a flanged cap piece 94. The plane of the dial of the indicator is indicated at 96 and it will be seen that this is inclined to the grip 18 at such an angle that when the instrument is grasped in the hand, the dial will lie squarely in front of the operator where it can be readily seen.

In operation, the grip or handle 18 is grasped in one hand by the operator and simultaneously the fore finger of the hand will actuate the trigger to compress the spring 76 and allow the spring 42 to withdraw the gauge pin. The arms 14 and 16 are made to straddle the work W with the positioning plates 22 and 28 resting against the circumference of the latter. The plates cause the U-shaped frame member to take a position at right angles to the axis of the work piece so that, when the trigger is released, the gauge pin will necessarily slide against a portion of the circumference of the work piece which is exactly diametrically opposite to the line of contact of the positioning plate 28. The spring 76 always forces the gauge pin against the work with the same pressure. Hence the diameter is accurately found and indicated.

Although the invention has been described by reference to a specific apparatus, it should be understood that, in its broader aspects, it is not necessarily limited to the illustrative embodiment thereof.

I claim:

1. In an external diameter gauge, a frame to straddle the work to be gauged and having work positioning plates arranged at right angles to one another, a gauge pin slidable in the frame at right angles to one of said plates, a lever pivoted to the frame and having means to operate the gauge pin, an indicator actuated by the lever, and means for moving the lever; substantially as described.

2. In an external diameter gauge, a frame to straddle the work to be gauged and having work positioning means, a gauge pin slidable in the frame at right angles to the work, a lever pivoted to the frame and having means to operate the gauge pin, a spring engaging said lever to force the gauge pin against the work, an indicator actuated by the lever, means for moving the lever to permit withdrawal of the gauge pin, and means for automatically withdrawing the pin when the lever is so moved; substantially as described.

3. In an external diameter gauge, a frame to straddle the work to be gauged and having work positioning means, a gauge pin slidable in the frame at right angles to the work, a spring for withdrawing the gauge pin, a lever pivoted to the frame and having means to contact with the gauge pin, a spring engaging said lever to force the gauge pin against the work, an indicator actuated by the lever, and means for moving the lever to allow operation of the first spring; substantially as described.

4. In an external diameter gauge, a frame to straddle the work to be gauged and having work positioning means, a gauge pin slidable in the frame at right angles to the work, a spring for withdrawing the gauge pin, a lever pivoted at one end to the frame and having a surface near its pivot to contact with the gauge pin, a spring engaging said lever to force the gauge pin against the work, an indicator actuated by the lever, and means for moving the lever to allow operation of the first spring; substantially as described.

5. In an external diameter gauge, a frame to straddle the work to be gauged and having work positioning means, said frame also having a recess, a gauge pin slidable through the frame and projecting into the recess, a lever pivoted in the recess and having means to operate said gauge pin, an indicator having a stem projecting into the recess against said lever, and means projecting outside the recess for moving the lever; substantially as described.

6. In an external diameter gauge, a frame to straddle the work to be gauged and having work positioning means, said frame also having a recess, a gauge pin slidable through the frame and projecting into the recess, a lever pivoted in the recess and having means to operate said gauge pin, an indicator having a stem projecting into the recess against said lever, a grip attached to the frame and having a hand opening communicating with said recess, and a trigger projecting into said opening for moving the lever; substantially as described.

7. In an external diameter gauge, a frame to straddle the work to be gauged and having work positioning means, said frame also having a recess, a gauge pin slidable in the frame, a lever pivoted in the recess and having means to operate the gauge pin, a grip on the frame, means adjacent to the grip for moving the lever, and an indicator actuated by the lever and having a dial at the end of said grip; substantially as described.

8. In an external diameter gauge, a frame constructed and arranged to straddle the piece of work to be tested and having a recess, a gauge pin slidable mounted in the frame to move at right angles to the work, an indicator carried by the frame, a grip, a lever pivotally mounted in the recess and transmitting movement from said gauge pin to the indicator, and a trigger engaging the lever and projecting towards said grip for automatically sliding the pin inwardly when the instrument is grasped for application to the work; substantially as described.

9. In an external diameter gauge, a frame to straddle the object to be gauged, positioning plates secured to the frame to engage two sides of the object, a gauge pin slidable in the frame at right angles to one of the positioning plates, a lever pivoted to the frame and having means to operate the gauge pin, a spring engaging said lever to force the gauge pin against the object, an indicator actuated by the lever, and means for moving the lever to withdraw the gauge pin; substantially as described.

10. In an external diameter gauge, a frame to straddle the object to be gauged, positioning plates secured to the frame to engage two sides of the object, a gauge pin slidable in the frame at right angles to one of the positioning plates, a spring for withdrawing the gauge pin, a lever pivoted to the frame and having means to contact with the pin, a spring engaging said lever to force the gauge pin against the object, an indicator actuated by the lever, and a trigger for moving the lever to allow operation of the first spring; substantially as described.

11. In an external diameter gauge, a frame to straddle the object to be gauged, positioning plates secured to the frame to engage two sides of the object, a gauge pin slidable in the frame at right angles to one of the positioning plates, a spring for withdrawing the gauge pin, a lever pivoted to the frame and having means to contact with the pin, a spring engaging said lever to force the gauge pin against the object, an indicator actuated by the lever, a trigger for moving the lever to allow operation of the first spring, and a grip fixed to the frame and enclosing the end of the trigger; substantially as described.

12. In an external diameter gauge, a frame having a substantially U-shaped portion to straddle a piece of work, a flat plate attached to the base of the U, a second flat plate attached to one of the arms of the U, a gauge pin slidable in the other arm of the U at right angles to the second plate, means for moving the gauge pin away from the second plate and an indicator actuated by the movement of the gauge pin; substantially as described.

13. In an external diameter gauge for cylindrical objects, a frame having a substantially U-shaped portion to straddle the object, a flat plate attached to the base of the U between the arms thereof, said plate being extended at right angles to the frame, a second flat plate attached to one of the arms of the U, said plate also being extended at right angles to the frame, a gauge pin slidable in the other arm of the U at right angles to the surface of the second plate, and an indicator actuated by the movement of the gauge pin; substantially as described.

In testimony whereof I hereunto affix my signature.

RICHARD J. BRITTAIN, Jr.